(12) United States Patent
Jabara et al.

(10) Patent No.: US 7,970,351 B2
(45) Date of Patent: Jun. 28, 2011

(54) SYSTEM AND METHOD FOR DIRECT COMMUNICATION BETWEEN WIRELESS COMMUNICATION DEVICES

(75) Inventors: Gary Bernard Jabara, Irvine, CA (US); Christos Karmis, Irvine, CA (US)

(73) Assignee: E3 LLC, Newport Beach, CA (US)

( * ) Notice: Subject to any disclaimer, the term of this patent is extended or adjusted under 35 U.S.C. 154(b) by 381 days.

(21) Appl. No.: 12/397,225

(22) Filed: Mar. 3, 2009

(65) Prior Publication Data

US 2010/0227554 A1 Sep. 9, 2010

(51) Int. Cl.
*H04B 7/00* (2006.01)
(52) U.S. Cl. ............... 455/41.2; 455/41.3; 455/456.1
(58) Field of Classification Search ............ 455/41.2, 455/41.3, 456.1, 456.2, 456.3
See application file for complete search history.

(56) References Cited

U.S. PATENT DOCUMENTS

| 7,249,182 | B1 | 7/2007 | Heinonen et al. | |
| 7,254,406 | B2 | 8/2007 | Beros et al. | |
| 2008/0215689 | A1 | 9/2008 | Pietila | |
| 2010/0227610 | A1* | 9/2010 | Jabara et al. | 455/432.3 |
| 2011/0076948 | A1* | 3/2011 | Jabara et al. | 455/41.2 |

FOREIGN PATENT DOCUMENTS

EP 1434459 6/2004

OTHER PUBLICATIONS

Nintendo—DS Lite Instruction Booklet; 2007; Cover and pp. 1-2, 14-15, and 16-17; US and Canada.

* cited by examiner

*Primary Examiner* — An T Luu
(74) *Attorney, Agent, or Firm* — MIchael J. Donohue

(57) ABSTRACT

A wireless communication device includes conventional components to permit a network communication link to be established with a wireless communication network. In addition, the wireless communication device includes a non-network short-range transceiver that detects the presence of other similarly equipped devices. When two such equipped devices come within proximity of each other, a direct non-network wireless communication link is established. The two devices exchange portions of profile data and each analyzed the received profile data. If a match occurs, a contact notification is generated. This permits the wireless communication device to act as an auto-detecting social network device that detects the proximity of other devices whose owners have a profile that matches the stored user preference data. Subsequent communication may occur in a conventional manner using the wireless network communication channels and web applications may also be used to gain additional information.

19 Claims, 5 Drawing Sheets

SYSTEM AND METHOD FOR DIRECT COMMUNICATION BETWEEN WIRELESS COMMUNICATION DEVICES

BACKGROUND OF THE INVENTION

1. Field of the Invention

The present invention is directed generally to wireless communication devices and, more particularly, to a system and method that allows direct communication between wireless communication devices.

2. Description of the Related Art

Wireless communication networks have become commonplace. A vast array of base stations are provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, more modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allow group members to communicate with each other using PTT technology. Thus, when one group member presses the PTT button, the communication from that individual is automatically transmitted to the communication devices of other group members. While this gives the appearance of direct communication between the wireless devices, the communications between group members is also relayed via one or more base stations as part of the wireless network.

Therefore, it can be appreciated that there is a need for wireless communication devices that can communicate with the communication network via base stations, but may also communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
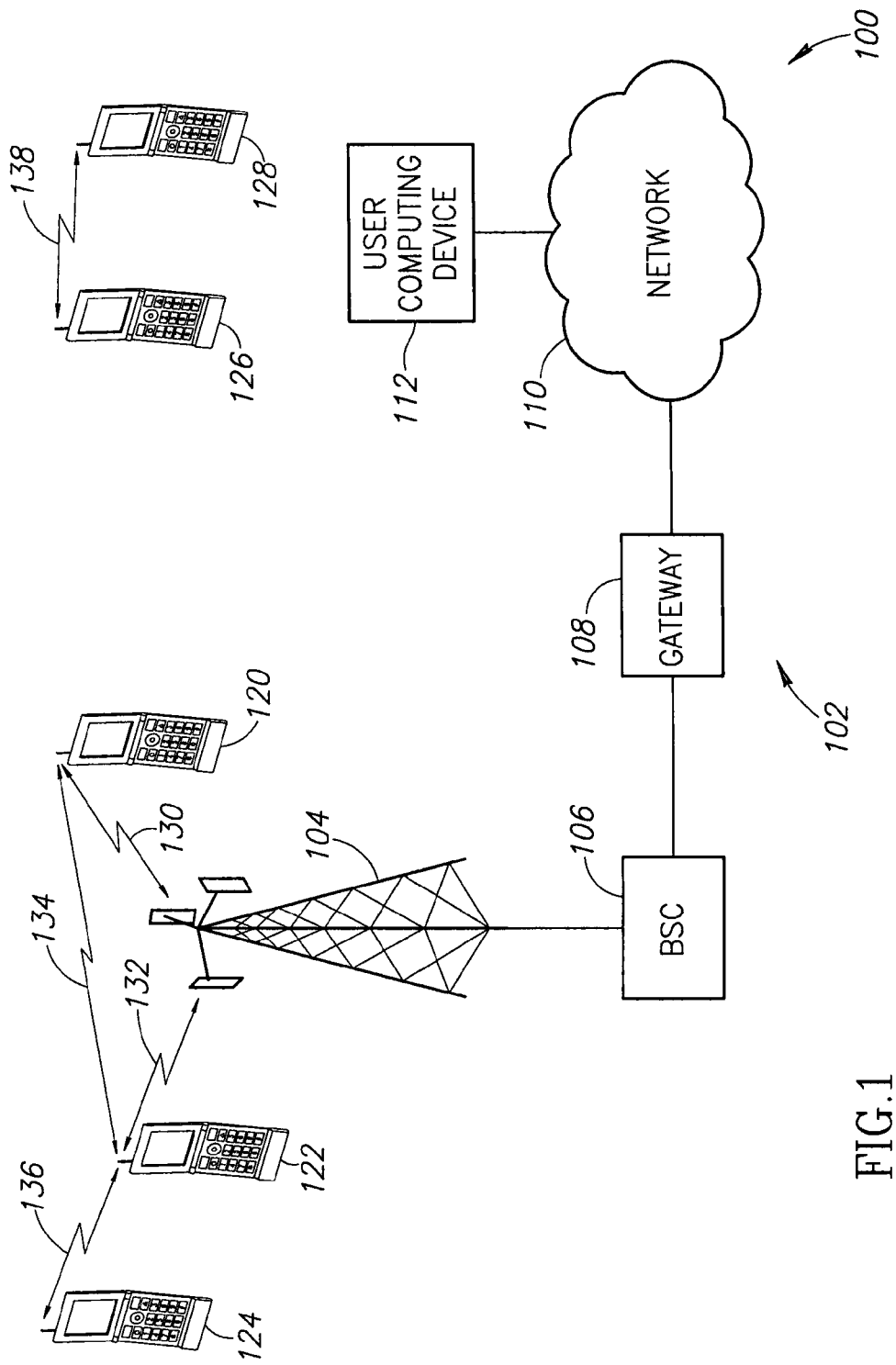
FIG. 1 is a diagram illustrating a system architecture configured to implement a communication system in accordance with the present teachings.

The system described herein extends the normal operational features of conventional wireless communication devices. As described above, the conventional wireless communication device communicates with a wireless communication network via a base station. The extended capabilities described herein provide a second transceiver device that allows wireless communication devices to communicate directly with each other over a short-range. The wireless communication devices are illustrated as part of a system 100 illustrated in the system architecture in FIG. 1. Portions of the system 100 are conventional network components that will be described briefly herein. The non-network communication capability, which may be referred to herein as a "jump-enabled" device or a "jump" device, will be described in greater detail below.

A conventional wireless communication network 102 includes a base station 104. Those skilled in the art will appreciate that the typical wireless communication network 102 will include a large number of base stations 104. However, for the sake of brevity and clarity and understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104. Those skilled in the art will appreciate that the wireless communication network 102 may communicate using a variety of different signaling protocols. For example, the system 100 may be successfully implemented using, by way of example, CDMA, WCDMA, GSM, UMTS, and the like. The system 100 is not limited by any specific operational mode for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104. Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices.

This short-range communication is accomplished via non-network communication links. For example, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a non-network communication link 134.

As illustrated in FIG. 1, the wireless communication device 124 is not in communication with the wireless communication network 102. However, the wireless communication device 124 can communicate directly with the wireless communication device 122 via a non-network wireless communication link 136. Also illustrated in FIG. 1 are the wireless communication devices 126-128. Although neither of these devices (i.e., the wireless communication devices 126-128) are in communication with the wireless communication network 102, the two devices are in direct communication with each other via a non-network wireless communication link 138. Thus, jump-enabled wireless communication devices must be in proximity with each other, but need not be in communication with the wireless communication network or even in an area of wireless coverage provided by the wireless communication network 102.

Figure 2:
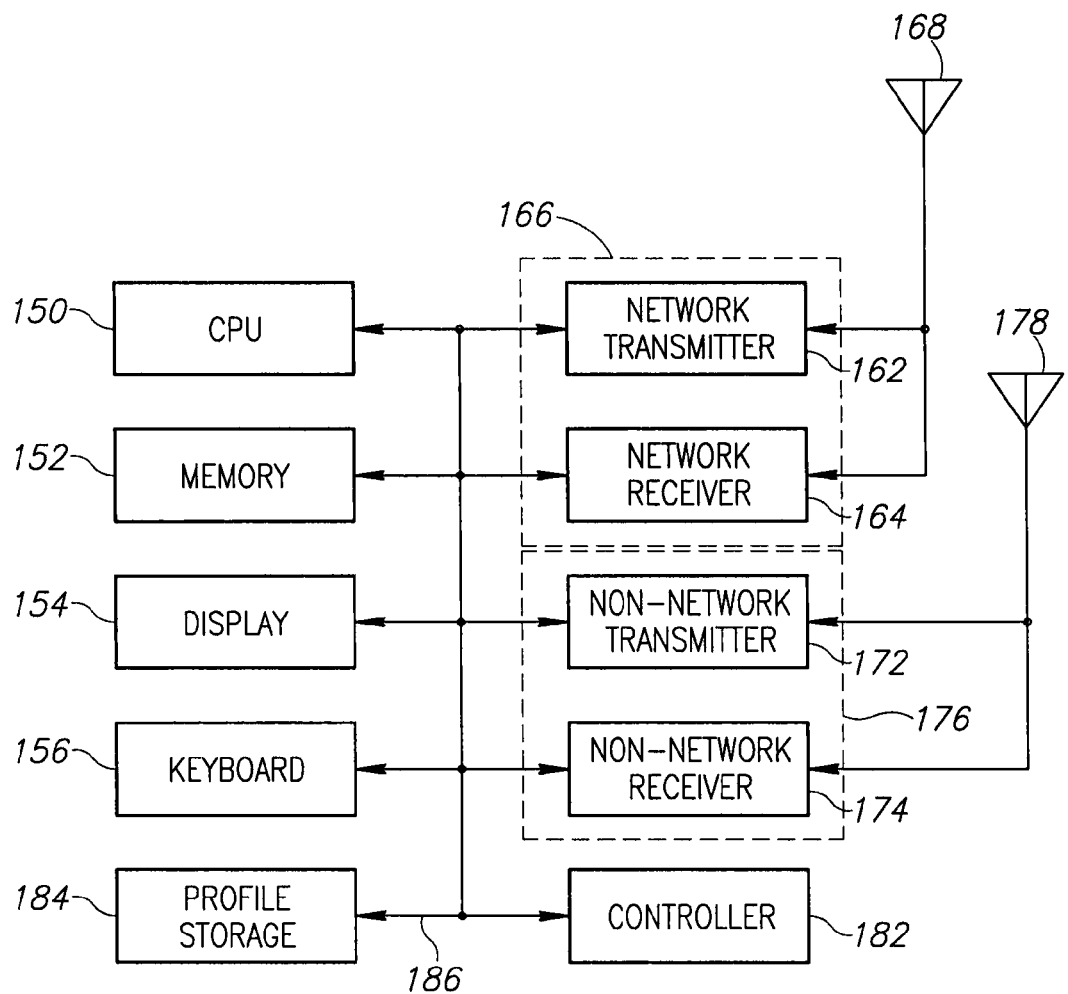
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. The memory 152 may store instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for normal network wireless communication with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 are implemented as a network transceiver 166. The network transceiver 166 is connected to an antenna 168. Operation of the network transceiver 166 and the antenna 168 for communication with the wireless network 102 is well-known in the art and need not be described in greater detail herein.

The wireless communication device 120 of FIG. 2 also includes a non-network transmitter 172 that is used by the wireless communication device 120 for direct communication with other jump-enabled wireless communication devices (e.g., the wireless communication device 122 of FIG. 1). FIG. 2 also illustrates a non-network receiver 174 that operates in conjunction with the non-network transmitter 172 to communicate directly with other jump-enabled wireless (e.g., the wireless communication device 122 of FIG. 1). In a typical embodiment, the non-network transmitter 172 and non-network receiver 174 are implemented as a non-network transceiver 176. The non-network transceiver 176 is connected to an antenna 178. In an exemplary embodiment, the antennas 168 and 178 may have common components are implemented as a single antenna.

In an exemplary embodiment, the non-network transceiver 176 may be designed for operation in accordance with IEEE standard 802.11. In one embodiment, a jump-enabled wireless communication device operates in an "ad hoc" mode defined by IEEE 802.11, which allows devices to operate in an independent basic service set (IBSS) network configuration. In this manner, jump-enabled wireless communication devices (e.g., the wireless communication devices 120-128) communicate directly with each other in a peer-to-peer manner using unlicensed frequency bands. Low power operation limits the range of communication to approximately 100 feet. Although the operational range of jump-enabled devices can be more or less than 100 feet, jump-enabled wireless communication devices are designed for short range communication capability.

All jump-enabled wireless communication devices use the same service set identifier (SSID) and the same physical radio channel (PHY) to permit each jump-enabled wireless communication devices to detect and identify other jump-enabled wireless communication devices. In addition, since there is no access point, all jump-enabled wireless communication devices take on the responsibilities of the medium access layer (MAC) that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the physical layer (PHY), the transceiver may operate in a direct frequency spread spectrum (DSSS) or a frequency hopping spread spectrum (FHSS) operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) or under IEEE 802.11b/g at 2.4 GHz.

In operation, the first active jump-enabled device (e.g., the wireless communication device 120) establishes an IBBS and starts sending beacon signals at approximately 10 per second. The beacon signals are used to maintain synchronization among the various jump-enabled devices. Other ad hoc jump-enabled wireless communication devices (e.g., the wireless communication device 122 of FIG. 1) can join the network after receiving the beacon signal and accepting the IBSS parameters. After receiving a beacon signal, each station updates their local internal clock with the time stamp found in the beacon frame. This ensures that all stations are able to perform operations, such as beacon transmission and power management functions, at the same time. Operation of devices under IEEE 802.11 are generally known in the art, and need not be described in greater detail herein. Once a non-network wireless communication link (e.g., the non-network wireless communication link 134 between the wireless communication devices 120 and 122 in FIG. 1) is established, profile data stored in the two wireless communication devices will be analyzed. In an exemplary embodiment, a controller 182 transmits a portion of data stored in a profile storage 184 to any jump-enabled device with which it can establish a non-network wireless communication link. In addition, the controller 182 may receive portions of data from the corresponding profile storage 184 in the wireless communication device with which the non-network communication link has been established. Details of the profile analysis are provided below.

Those skilled in the art will recognize that the controller 182 may be implemented as a series of computer instructions stored in the memory 152 and executed by the CPU 150. However, the controller 182 is shown as a separate block in the functional block diagram of FIG. 2 because it performs a separate function.

The profile storage 184 may be implemented as any convenient data structure, whether in the form of a data table, database, spreadsheet, or the like. In an exemplary embodiment, the profile storage 184 may be implemented as part of the memory 152, but is shown in the functional block diagram of FIG. 2 because it performs a separate function in the wireless communication device 120. In one embodiment, the profile storage 184 may be implemented on a removable memory card to make it easily transferable to another jump-enabled wireless communication device. Some conventional wireless communication devices utilize a removable Subscriber Identity Module (SIM) card that is easily installed and removed thus making it easy for the consumer to switch phones. In a similar fashion, the profile storage 184 could be implemented as part of a SIM card or similar device.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

When the jump-enabled wireless communication device 120 comes within range of any other jump-enabled wireless communication device (e.g., the wireless communication device 122 of FIG. 1), it establishes a non-network wireless communication link (e.g., the non-network wireless communication link 134). However, the users of the jump-enabled wireless communication devices 120-122 may not be immediately notified of the detection. Instead, the controller 182 analyzes the profile storage 184 in each device to determined whether there is a suitable match that warrants notification to the users of the respective wireless communication devices. In this aspect, system 100 functions as a wireless social network implemented on direct communication links between jump-enabled wireless communication devices. Conventional social networks are user-initiated. That is, the user must identify a potential contact and ask to be added to that person's "friends" list. In contrast, the system 100 is auto-initiated in that an initial contact is made automatically based on the determination of matching parameters from the profile storage 184.

Figure 3:
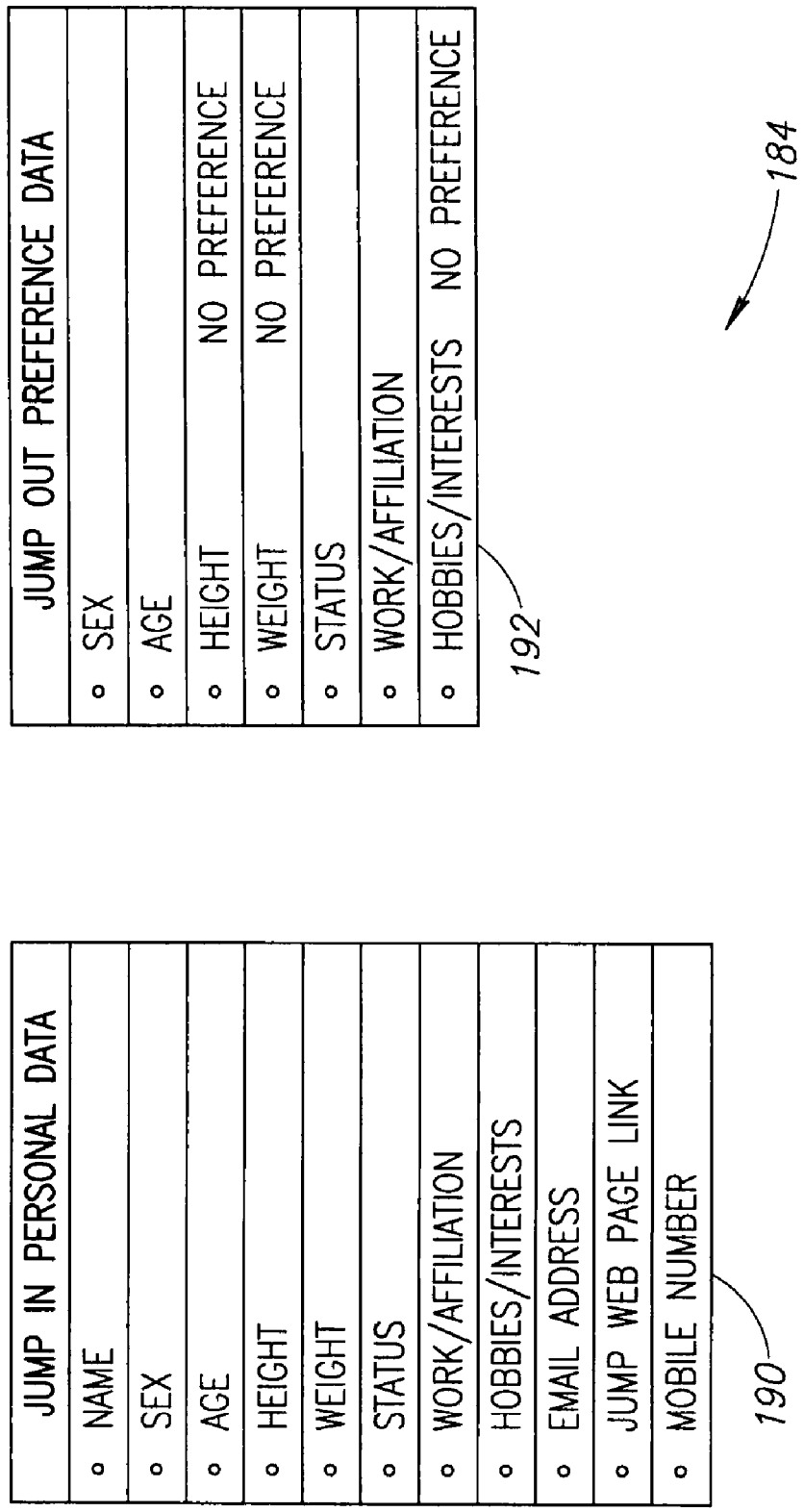
FIG. 3 illustrates an example of profile storage in the wireless communication device of FIG. 2.

FIG. 3 illustrates a form of personal data and preference data that may be stored in the profile storage 184. In one portion of the profile storage 184, the user of a wireless communication device 120 may enter personal data. As used herein, the personal data used to described the individual owner of the wireless communication device is referred to as a "Jump In" data portion 190 of the profile storage 184 or simply referred to as Jump In data. The Jump In data can include any personal data regarding the user that the user wishes to make available to another jump-enabled wireless communication device. Jump In data may include, but is not limited to, Name, Sex, Age, Height, Weight, Status (e.g., relationship status), Work/Affiliation, Hobbies/Interests, e-mail address, Jump web page link, Phone Number, and the like. A Work/Affiliation may include job information for a professional as well as affiliation, such as a student at a particular school. In addition, affiliation may include, by way of example, religious affiliation or sports fan affiliation, such as a fan of a particular football or baseball team. Some information, such as an e-mail address and phone number may be optional.

Also illustrated in FIG. 3 is a table of preference data for relationships or contacts that the user of the wireless communication device 120 is seeking. The preference data is referred to herein as a "Jump Out" data portion 192 of the profile storage 184 or simply referred to as Jump Out data. Jump Out data may include, but is not limited to, Sex, Age, Height, Weight, Status, Work/Affiliation, Hobbies/Interests, and the like. Alternatively, a user may specify no preference at all.

In one embodiment, each of the wireless communication devices for which non-network wireless communication links have been established may exchange the Jump In data with other detected jump-enabled wireless communication devices. For example, when the wireless communication device 126 in FIG. 1 detects the presence of another jump-enabled wireless communication device (i.e., the wireless communication device 128), the non-network wireless communication link 138 is established. Once the non-network wireless communication link 138 is established, the wireless communication device 126 transmits its Jump In data to the wireless communication device 128. At substantially the same time, the wireless communication device 128 transmits its Jump In data to the wireless communication device 126. The controllers 182 in each of the respective wireless communication devices compares the received Jump In data with the Jump Out preference data stored in the respective profile storages 184. If the received Jump In data provides a suitable match to the Jump Out preference data for each of the wireless communication devices, the controllers 182 in the respective wireless communication devices generates a contact notification to the user of the wireless communication device.

In one embodiment, the wireless communication devices (e.g., the wireless communications devices 126-128 of FIG. 1) will only exchange Jump In data for data elements for which a Jump Out preference has been stated. For example, if the Jump Out preference data of one wireless communication device indicates no preference for age, height, or weight, the controller 182 may transmit the Jump In data minus the age, height, and weight. Those skilled in the art will appreciate that additional communications must be exchanged between the respective controllers 182 to initially establish which portions of Jump In data must be transmitted.

The contact notification may be in the form of data sent to the display 154 of each respective wireless communication device. In addition, the wireless communication device may provide an audio notification in the form of a beep or other tone. In yet another alternative embodiment, the controller 182 may cause the wireless communication device to vibrate as a form of notification if the user has placed the wireless communication device in a silent mode.

In an exemplary embodiment, the contact notification is generated only in the event that the controllers 182 in each of the respective wireless communication devices 126-128 find a suitable match between the received Jump In personal data and the Jump Out preference data. For example, the Jump In data transmitted from the wireless communication device 126 to the wireless communication device 128 may provide a suitable match to the Jump Out preference data stored in the profile storage 184 in the wireless communication device 128. This would provide a suitable match. However, if the Jump In personal data transmitted from the wireless communication device 128 to the wireless communication device 126 did not provide a suitable match to the jump out preference data in the profile storage 184 in the wireless communication device 126, neither wireless communication device would provide a contact notification to the user. In this embodiment, a secondary communication must occur between the wireless communication devices to indicate that each of the respective controllers 182 have determined that a match exists and that the contact notifications may be generated in each of the wireless devices.

Alternatively, the controller 182 and the wireless communication device 126 may provide a provisional contact notification to the user of the wireless communication device indicating that some match may have occurred, but indicating that not all preference data matched the received Jump In data. For example, the received Jump In data may match the Jump Out preference data in some categories, but does not match in the Work/Affiliation category. The controller 182 in the wireless communication device 126 may indicate the area of mismatch and allow the user the option of overriding the preference mismatch. In this event, contact notifications could be sent to the users of both wireless communication devices 126 and 128.

In yet another alternative, a contact notification may be provided to the users of both wireless communication devices (e.g., the wireless communication devices 126-128 of FIG. 1) even if there was a mismatch between the Jump In data and the Jump Out preference data in one or both of the wireless communication devices. This may provide the user of the wireless communication device the options of permitting the contact to proceed. It is well known that wireless communication devices may have programmable buttons near the display 154. Alternatively, the display 154 may be touch display that permits programmable buttons to be shown on the touch screen itself. The user may activate one of the programmable buttons to continue the contact or to terminate the contact. As noted above, a user may specify no preference at all in the Jump Out preference data. With the selection of this option, the wireless communication device can, in one embodiment, notify the user of any contact with another jump-enabled wireless communication device. Alternatively, a user that specifies no Jump Out preference data may only receive a contact notification if that user's Jump In data matches the Jump Out data of the jump-enabled wireless communication device with which a non-network communication link has been established.

In yet another embodiment, the users of both wireless communication devices may have no preference specified in the Jump Out preference data. In this case, the controller 182 in each wireless communication device may generate a contact notification as soon as the non-network wireless communication link has been established.

Those skilled in the art will appreciate that Jump In data and Jump Out data may be implemented in a flexible manner. For example, the user may prioritize or weight preference data in the Jump Out data such that some factors are more important than others. In yet another embodiment the weighting factors may be easily altered by the user. For example, the user may be attending an out-of-town sporting event. The user may alter the weighting factor for affiliation to identify only those nearby jump-enabled wireless communication devices that have the same sports affiliation (i.e., they are fans of the same team). As another example, a user may be attending a college homecoming football game and may wish to increase the weighting factor to identify college classmates either by graduate date, major, or a combination thereof. Thus, the user has great flexibility in entering Jump Out preference data to thereby selectively identify nearby jump-enabled devices whose users have the unique characteristics being searched for by the user. In this manner, the wireless communication device (e.g., the wireless communication device 120) functions as an auto-detecting social networking device that identifies nearby individuals whose characteristics match the preferences indicated by the user of the wireless communication device.

The discussion above describes the interaction between two jump-enabled wireless communication devices. However, the concept may be extended to multiple wireless communication devices. As illustrated in FIG. 1, the wireless communication device 122 is within range of the wireless communication devices 120 and 124. When the presence of the wireless communication devices 120 and 124 are detected by the wireless communication device 122, the non-network wireless communication links 134 and 136, respectively, are established. Once the non-network wireless communication links are established, each of the devices will transmit the Jump In data to the other detected jump-enabled wireless communication devices. In the example of FIG. 1, the wireless communication device 122 transmits its Jump In data to both the wireless communication device 120 and the wireless communication device 124. In turn, the wireless communication device 122 receives the Jump In data from the wireless communication device 120 and also receives the Jump In data from the wireless communication device 124. The controller 182 in the wireless communication device 122 performs an analysis on each of the received Jump In data sets for comparison with the Jump Out preference data stored in the profile storage 184 of the wireless communication device 122. Thus, the controller 182 may send multiple contact notices to the user if there are satisfactory matches between the multiple sets of Jump In data and the stored Jump Out preference data. Those skilled in the art can appreciate that this concept may be extended even further to a large number of jump-enabled wireless communication devices.

The user may enter Jump In and Jump Out data into the profile storage 184 in a variety of different manners. A relatively simple application program running on the wireless communication device (e.g., the wireless communication device 120 of FIGS. 1-2) may allow the user to enter data via the keyboard 156. The application may also permit the user to arrange the order of preference in the Jump Out data or to declare that certain data elements (e.g., height and weight) have no preference.

In an alternative embodiment, the user may enter Jump In data and Jump Out preference data remotely. As illustrated in FIG. 1, a user may operate the user computer device 112 to enter Jump In and/or Jump Out data via the user computing device 112 and the network 110. The user-entered data is transmitted via the gateway 108 and, ultimately, via the base station 104 to the jump-enabled wireless communication device. In this embodiment, data for the profile storage 184 is provided via a network communication link and downloaded via the wireless communication network 102 to the jump-enabled wireless communication device.

The non-network wireless communication links are not intended to supplant communication via the wireless communication network 102. Those skilled in the art will appreciate that the non-wireless communication link may be transitory in nature because of the short communication range. The jump-enabled wireless communication device is intended to identify nearby contacts with which a person may share common interests. Thus, the jump-enabled communication device serves as a transitory detection and introduction technology, but does not replace normal voice communication, text messaging, photo sharing, video sharing, and the like, which occur through the wireless communication network 102. In typical operation, subsequent communication may take place face-to-face or through communication on the wireless communication network, such as email, text messaging, wireless telephone call, or the like.

Figure 4:
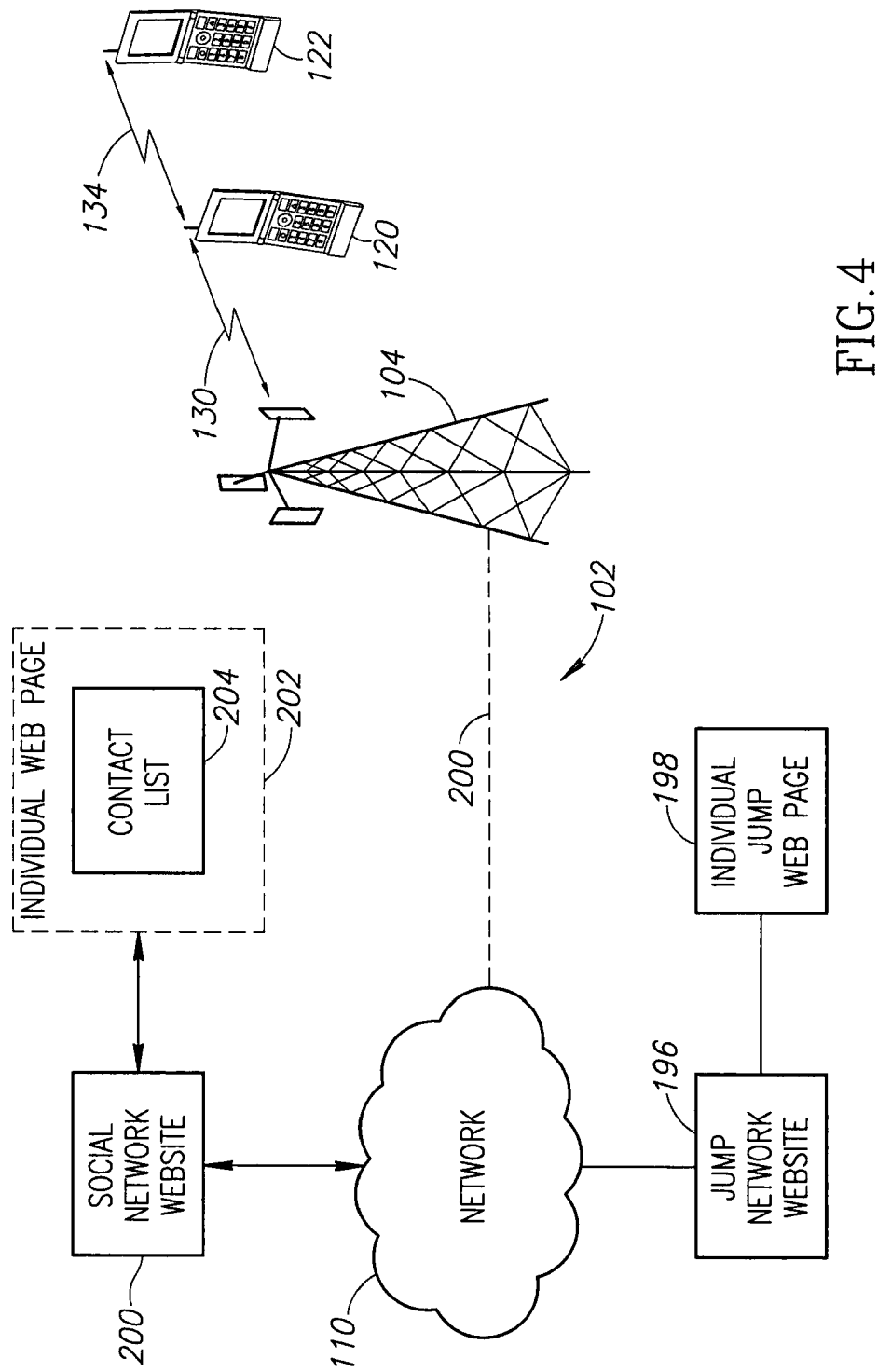
FIG. 4 illustrates an operational mode of the wireless communication device of FIG. 2.

The jump-enabled wireless communication device 120 also has numerous web-enabled applications. For example, an individual user may set up a jump website with information regarding that individual. In this aspect, the jump website may be similar to individual websites and any other conventional social network. The jump website may be accessed via the network 110 from the user computing device 112 (see FIG. 1). Alternatively, the jump website may be accessed by any web-enabled wireless communication device. For example, in FIG. 1, a non-network wireless communication link 134 has been established between the wireless communication devices 120 and 122. The wireless devices exchange the Jump In data, as described above, which is analyzed by the controller 182 (see FIG. 2). If a match occurs between the received Jump In data and the Jump Out data stored in the profile storage 184, the contact indicators are generated, as described above. Following an initial contact, the user of a wireless device (e.g., the wireless device 120) may use the web-browsing capability of the wireless communication device to access an individual jump web page for the individual with whom contact has just been made. This embodiment is illustrated in FIG. 4 where the wireless communication device 120 communicates with the base station 104 via the network wireless communication link 130. The wireless communication device 120 may use conventional web-browsing techniques to request access to a jump network website 196 via the network 110. Further, the wireless communication device 120 may request access to an individual jump web page 198 corresponding to the user of the wireless communication device 122. In an exemplary embodiment, initial data exchange between the wireless communication devices 120-122 via the non-network wireless communication link 134 may include a link to the individual jump web page 198. That is, if a match is determined by the controllers 182 in the respective wireless communication devices 120 and 122, the wireless communication device 120 may use the transmitted jump web page link to easily access the individual jump web page 198. Thus, the initial social contact made via the non-network wireless communication link 134 can readily provide additional information, in the form of a web link to allow the users of the wireless communication devices to gain further information via the wireless communication network 102. It should be noted that FIG. 4 illustrates a communication link 200 between the base station 104 and the network 110. This communication link 200, as a dashed line, is part of the wireless communication network 102 and includes a number of elements, such as the VSC 106 and Gateway 108 illustrated in FIG. 1. For the sake of clarity, the various network elements connecting the base station 104 with the network 110 are replaced merely by the communication link 200 in FIG. 4. In yet another aspect, the system 100 can utilize information from existing social networks. In a typical social network, each individual has a list of "friends" or "contacts" that are maintained for that individual. In one embodiment, a jump-enabled wireless communication device (e.g., the wireless communication device 120) may download the contact list for storage as part of the profile storage 184. This is also illustrated in FIG. 4 where a social network website 200 includes an individual web page 202. For that individual, a contact list 204 contains a list of all individuals that the owner of the individual web page 202 has identified as part of that individual's social network. In this aspect, the contact list 204 may be downloaded via the wireless communication network 102 to the wireless communication device 120 for storage in the profile storage 184.

In operation, the wireless communication device 120 searches for contacts in the manner described above. When a non-network wireless communication link (e.g., the non-network wireless communication link 134) is established, the Jump In data is exchanged between the wireless communication devices 120 and 122, in the manner described above. If the user of the wireless communication device 122 is already on the contact list 204 (now downloaded and stored in the profile storage 184), the wireless communication device 120 may immediately generate a contact notification to the user of the wireless communication device 120. In this embodiment, the controller 184 need not do a detailed comparison between the Jump In data received from the wireless communication device 122 and the store Jump Out preference data stored in the profile storage 184. Rather, the mere match between the user name of the wireless communication device 122 in the received Jump In data provides a match with the contact list 204 and the contact notification is generated. In another aspect of this embodiment, the wireless communication device 120 may transmit a web link to the individual web page 202 to enable the user of the wireless communication device 122 to gain additional information about the individual user of the wireless communication device 120. This may be in place of, or in addition to, an individual jump web page link, described above. Thus, system 100 allows seamless integration with existing social network websites as well as a jump network website.

Figure 5:
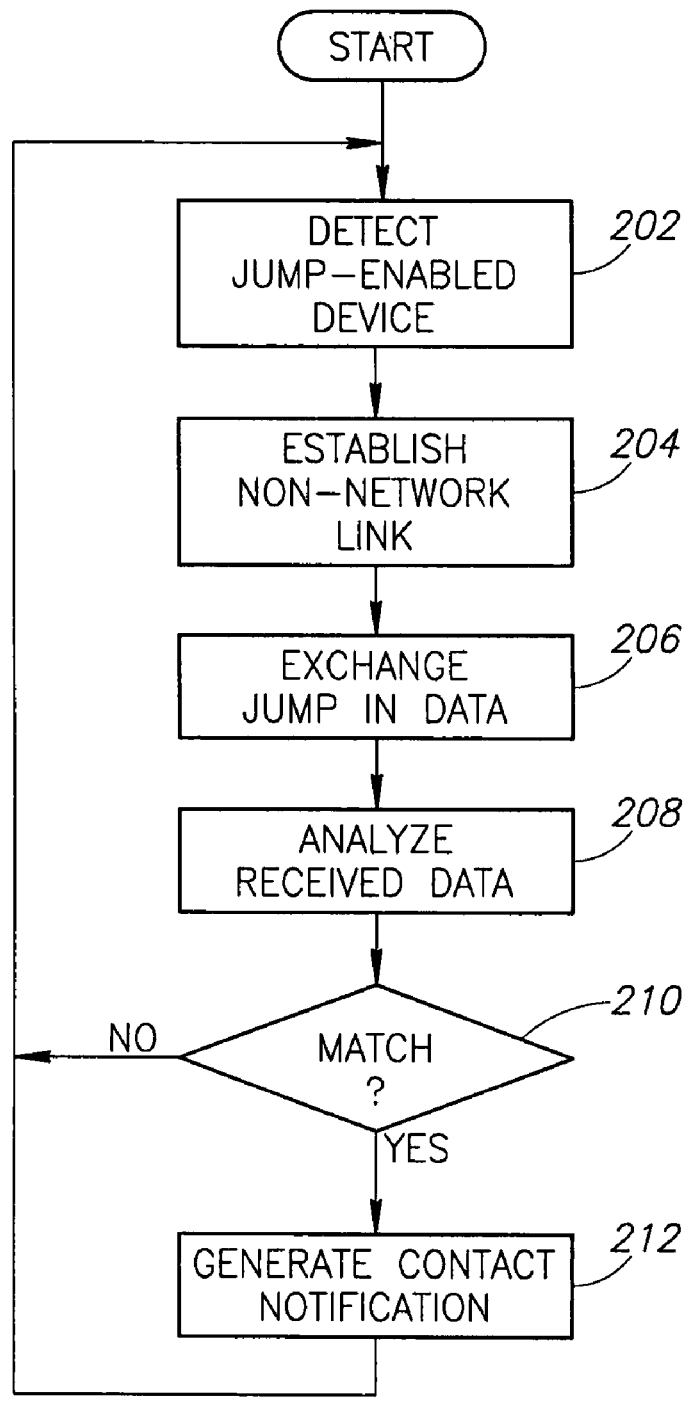
FIG. 5 is a flow chart illustrating the operation of the wireless communication devices of FIG. 1.

The operation of the system 100 is illustrated in the flow chart of FIG. 5 where a jump-enabled wireless communication device detects the proximity of another jump-enabled wireless communication device in step 202. A technique for peer-to-peer communication has already been described with respect to IEEE 802.11. Other peer-to-peer technologies may also be satisfactory to implement the non-network wireless communication links. The system 100 is not limited by the specific form of technology used to implement the non-network wireless communication links. In addition, the wireless communication device (e.g., the wireless communication device 120) may include a user selective enablement of a jump-mode. In this manner, the user can control when the wireless communication device is jump-enabled. In step 204, the wireless communication device 120 establishes a non-network wireless communication link with another jump-enabled wireless communication device. Once the non-network wireless communication link has been established, the two jump-enabled wireless communication devices exchange the Jump In data portions of the respective profile storage 184 in step 206. There are a number of alternative techniques for exchanging information, as previously described. This may include, for example, the total exchange of all data stored in the Jump In data 190 or may include the transmission only of portions of the Jump In data 190 that correspond to portions of the Jump Out data for which a user has specified a preference.

In step 208, the controller of each wireless communication device analyzes the received Jump In data with respect to the Jump Out preference data 192 stored in the profile storage 184. A variety of different analysis techniques have been discussed above, including, for example, importance of various factors, the weighting of different factors, and the like. In one embodiment, the user may specify the importance of various factors merely by the sequence in which the preferences are arranged. In an alternative embodiment, the user may assign various importance levels to various factors. For example, the most important factors may be identified by a numeral "1" while a second tier of importance may be identified by a numeral "2." Various other matching algorithms may be used. The system 100 is not limited by the specific preference factors, or by the manner in which the preference factors are analyzed.

If there is a match between the received Jump In data and the stored Jump Out preference data, a match occurs in decision 210 and, in step 212, the wireless communication device generates a contact notification. As discussed above, the contact notification can occur based on individual analysis, or may be restricted to a situation in which both wireless communication devices have determined that a match exists. Various other techniques for determining whether a contact notification should be generated have been described above. If the controller determines that a match has not occurred, the result of decision 210 is NO. In that event, or following the generation of the contact notification in step 212, the system returns to step 202 to detect additional jump-enabled wireless communication devices.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communication system comprising:
a plurality of wireless communication devices each having:
a first transceiver configured to communicate with a wireless communication network;
a second transceiver configured to communicate other than with the wireless communication network wherein the second transceiver is a short-range non-network transceiver to permit direct communication between first wireless communication device and the second wireless communication device;
a controller configured to control operation of the second transceiver; and
a profile data storage area configured to store first and second portions of user profile data;
wherein the controller in a first of the plurality of wireless communication devices is configured to detect the presence of a second of the plurality of wireless communication devices in a location proximate the first wireless communication device, the controller in the first wireless communication device being further configured to analyze the second portion of the user profile data received from the second wireless communication device and the first portion of user profile data stored in the profile data storage area of the first wireless communication device to determine if there is a match between the first portion of user profile data stored in the profile data storage area of the first wireless communication device and the second portion of user profile data received from the second wireless communication device.

2. The system of claim 1 wherein the controller in the second wireless communication device is configured to analyze the received second portion of the user profile data from the first wireless communication device and the first portion of user profile data stored in the profile data storage area of the second wireless communication device to determine if there is a match between the first portion of user profile data stored in the profile data storage area of the second wireless communication device and the second portion of user profile data received from the first wireless communication device.

3. The system of claim 1 wherein the controller in the first wireless communication device is further configured to download a contact list from an external data source via the first transceiver in the first wireless communication device, and to store at least a portion of the downloaded contact list in the user profile data storage area in the first wireless communication device.

4. The system of claim 3 wherein the external data source is a social network web page of a user of the first wireless communication device.

5. The system of claim 3 wherein the controller in the first wireless communication device is further configured to analyze the received portion of the user profile data from the user profile data storage area in the second wireless communication device and the stored portion of the downloaded contact list in the first portion of the user profile data storage area in the first wireless communication device to determine if there is a match.

6. The system of claim 1 wherein the first portion of the user profile storage area of the first wireless communication device is configured to store user-selectable profile data and the second portion of the user profile storage area of the first wireless communication device is configured to store user-selectable preference data associated with a user of the first wireless communication device and the second portion of the user profile data received from the second wireless communication device is user profile data associated with a user of the second wireless communication device, the analysis by the controller in the first wireless communication device comprising an analysis of the user profile data received from the second wireless communication device and the user-selectable preference data associated with the user of the first wireless communication device to determine if there is a match between the user-selectable preference data stored in the first portion of the profile storage area of the first wireless communication device and the user profile received from the second wireless communication device.

7. The system of claim 1, further comprising a user-operable input device on the first wireless communication device wherein the first portion of the user profile storage area of the first wireless communication device is entered via the user-operable input device.

8. The system of claim 1 wherein the first portion of the user profile storage area of the first wireless communication device is transmitted to the first wireless communication device via the first network transceiver.

9. The system of claim 1 wherein the second transceiver is configured for operation in accordance with IEEE standard 802.11.

10. The system of claim 9 wherein the second transceiver is configured for operation in an ad-hoc operational mode.

11. The system of claim 1 wherein the first network transceiver is configured for operation using a physical layer operational mode selected from a group of operational modes comprising Direct Frequency Spread Spectrum (DSSS), Frequency Hopping Spread Spectrum (FHSS), and infrared.

12. The system of claim 1 wherein the controller in the first wireless communication device is further configured to provide a match indication if the controller in the first wireless communication device determines there is a match between the first portion of user profile data stored in the profile data storage area of the first wireless communication device and the second portion of user profile data received from the second wireless communication device.

13. The system of claim 1, further comprising a user-operable input 20 device on the first wireless communication device to permit entry of the first and second portions of the user profile data via the user-operable input device.

14. The system of claim 1 wherein first transceiver in the first wireless communication device is configured to receive the first and second portions of the user 25 profile data from the wireless communication network.

15. The system of claim 1 wherein the received portion of the user profile data in the user profile data storage area from the second wireless communication device includes a web-link indicating a network location associated with a user of the second wireless communication device, the controller in the first wireless communication device being further configured to pass the received web-link to the first transceiver in the first wireless communication device for transmission to the wireless communication network.

16. A communication system comprising:
  a first wireless communication device having:
    first communication means for establishing a communication link;
    first control means for controlling operation of the first wireless communication device; and
    first data storage means for storing first and second portions of user profile data for a user of the first wireless communication device;
  a second wireless communication device having:
    second communication means for establishing a communication link wherein the first and second means for establishing a communication link comprises a short-range transceiver in the first and second wireless communication devices, respectively, to establish a direct communication link between the first wireless communication device and the second wireless communication device;
    second control means for controlling operation of the second wireless communication device;
    second data storage means for storing first and second portions of user profile data for a user of the second wireless communication device, wherein the first control means is configured to detect the presence of the second wireless communication device in a location proximate the first wireless communication device and to establish a communication link therewith; and
    analyzer means for analyzing the second portion of the user profile data received from the second data storage means and the first portion of user profile data received from the first data storage means to determine if there is a match therebetween.

17. The system of claim 16 wherein the first control means provides an indication to a user that the second wireless communication device is within range of the first wireless communication device when analyzer means determines there is a match between the first portion of user profile data received from the first data storage means and the second portion of the user profile data received from the second data storage means.

18. The system of claim 16 wherein the second wireless communication device is configured to transmit the second portion of the user profile stored in the second data storage means to the first wireless communication device using the second communication means.

19. The system of claim 16 wherein the first data storage means is configured to store user-selectable profile data and user-selectable preference data and the received second portion of the user profile data in the second data storage means is user profile data associated with the user of the second wireless communication device, the analysis by first control means comprising an analysis of the received second portion of the user profile data associated with the user of the second wireless communication device and the user-selectable preference data to determine if there is a match between the user-selectable preference data stored in the first data storage means and the received second portion of the user profile data.

* * * * *